(12) United States Patent
Ikeda et al.

(10) Patent No.: US 8,420,743 B2
(45) Date of Patent: Apr. 16, 2013

(54) PROPYLENE-BASED COPOLYMER AND FILM MADE OF THE SAME

(75) Inventors: Kenji Ikeda, Ichihara (JP); Shigeki Kishiro, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/021,156

(22) Filed: Feb. 4, 2011

(65) Prior Publication Data
US 2011/0196106 A1 Aug. 11, 2011

(30) Foreign Application Priority Data

Feb. 9, 2010 (JP) ................................ 2010-026301

(51) Int. Cl.
*C08F 255/02* (2006.01)
*C08F 210/00* (2006.01)
*C08F 110/06* (2006.01)
*C08F 10/00* (2006.01)

(52) U.S. Cl.
USPC ......... 525/322; 526/348; 526/351; 526/348.1

(58) Field of Classification Search .................. 525/322; 526/348, 351, 348.1
See application file for complete search history.

(56) References Cited

U.S. PATENT DOCUMENTS

2009/0036590 A1 * 2/2009 Oobayashi ................... 524/450

FOREIGN PATENT DOCUMENTS

| JP | 56038339 A | | 4/1981 |
| JP | 2069549 A | | 3/1990 |
| JP | 2003-213068 A | | 7/2003 |
| JP | 2003213068 | * | 7/2003 |

* cited by examiner

*Primary Examiner* — William Cheung
(74) *Attorney, Agent, or Firm* — Panitch Schwarze Belisario & Nadel LLP

(57) ABSTRACT

A propylene-based copolymer is composed of 60 to 90% by weight of Component (A) that is a polymer component whose major structural unit is a structural unit derived from propylene and 10 to 40% by weight of Component (B) that is a propylene-ethylene copolymer component whose content of a structural unit derived from ethylene is 50 to 80% by weight, wherein the sum total of Component (A) and Component (B) is 100% by weight, wherein the ratio of the intrinsic viscosity of Component (B) ($[\eta]B$) to the intrinsic viscosity of Component (A) ($[\eta]A$)($[\eta]B/[\eta]A$) satisfies a formula: $1.3 < [\eta]B/[\eta]A \leq 2.0$, and the melt flow rate, measured at a temperature of 230° C. and a load of 21.18 N, of the copolymer is not less than 5 g/10 minutes and not more than 30 g/10 minutes.

8 Claims, No Drawings

PROPYLENE-BASED COPOLYMER AND FILM MADE OF THE SAME

BACKGROUND OF THE INVENTION

The present invention relates to propylene-based copolymers.

Particularly, it relates to propylene-based copolymers that have haze appropriate for matte film and are superior in appearance and rigidity, and also relates to films made of the same. In this specification, the expression "a film is superior in appearance" means primarily that the film has no or almost no fisheyes as large as they can be visually recognized.

Polypropylene is superior in rigidity, heat resistance and suitability for packaging and therefore is used widely in the field of materials for packaging such as food packaging and fiber packaging. In recent years, luxurious matte films comprising polypropylene as a major component have been awaited; for example, JP 56-38339 A discloses that a film having been improved in haze, which is a measure indicating the degree of translucency, can be obtained from a polypropylene resin composition in which a crystalline propylene-ethylene block copolymer has been mixed with such an organic peroxide that the temperature at which a half life of 10 hours is obtained is 60° C. or higher, JP 2-69549 A discloses that a product having been improved in matting effect can be obtained from a polypropylene-based resin composition to be obtained by a production method comprising heat-treating a mixture of a block copolymer containing a propylene homopolymer portion and an ethylene-propylene random copolymer portion which are obtained through polymerization on the same catalyst, polyethylene, a cross-linking aid, and radical generator, JP 2003-213068 A discloses that a polypropylene-based resin composition containing a propylene-based copolymer composed of a polymer component to be obtained by polymerizing a monomer component mainly comprising propylene and a propylene-ethylene copolymer component, and a propylene-based polymer improves the appearance and the moist feeling of a matte film.

However, further improvement in the appearance, particularly the balance between the haze and the quantity of fisheyes, of matte films has been desired.

BRIEF SUMMARY OF THE INVENTION

An object of the present invention is to provide a propylene-based copolymer that has a haze suitable for a matte film and that is superior in appearance (fisheye) and rigidity when having been formed into a film.

The present invention relates to a propylene-based copolymer composed of 60 to 90% by weight of Component (A) that is a polymer component whose major structural unit is a structural unit derived from propylene and 10 to 40% by weight of Component (B) that is a propylene-ethylene copolymer component whose content of a structural unit derived from ethylene is 50 to 80% by weight, wherein the sum total of Component (A) and Component (B) is 100% by weight, wherein the ratio of the intrinsic viscosity of Component (B) ($[\eta]B$) to the intrinsic viscosity of Component (A) ($[\eta]A$) ($[\eta]B/[\eta]A$) satisfies a formula: $1.3<[\eta]B/[\eta]A\leq 2.0$, and the melt flow rate, measured at a temperature of 230° C. and a load of 21.18 N, of the copolymer is not less than 5 g/10 minutes and not more than 30 g/10 minutes.

Moreover, the present invention relates to a film containing the propylene-based copolymer, in one preferred embodiment it relates to an unstretched film, and in another preferred embodiment it relates to a matte film. In the present invention, the term "unstretched film" refers to any film produced without undergoing any intentional stretching process, such as cast films. The term "matte film" refers to any film having irregularities on its surface and being low in glossiness.

In accordance with the present invention, it is possible to obtain a propylene-based copolymer that has a haze suitable for a matte film and that is superior in appearance and rigidity when having been formed into a film.

DETAILED DESCRIPTION OF THE INVENTION

The propylene-based copolymer of the present invention is composed of a polymer component whose major structural unit is a structural unit derived from propylene (hereinafter, sometimes referred to as "Component (A)") and a propylene-ethylene copolymer component whose content of a structural unit derived from ethylene is 50 to 80% by weight (hereinafter, sometimes referred to as "Component (B)").

The "major structural unit" in Component (A) of the propylene-based copolymer of the present invention refers to a structural unit that accounts for 90% by weight or more of the Component (A). A structural unit derived from propylene is the major structural unit of Component (A). The content of the structural unit derived from propylene in Component (A) is preferably from 90 to 100% by weight, more preferably from 95 to 100% by weight, and even more preferably 100% by weight.

In Component (A) may, according to need, have been copolymerized ethylene and/or an α-olefin having 4 to 12 carbon atoms, and the content of a structural unit derived from ethylene and/or the α-olefin having 4 to 12 carbon atoms is preferably 10% by weight or less, and more preferably 5% by weight or less. Examples of the α-olefin having 4 to 12 carbon atoms include 1-butene, 1-hexene, and 1-octene, and 1-butene is preferred. Component (A) is preferably a homopolymer of propylene.

The content of the structural unit derived from ethylene in Component (B) is preferably from 50 to 80% by weight, more preferably from 55 to 80% by weight, and even more preferably 60 to 80% by weight, wherein the weight of Component (B) is 100% by weight. When it is less than 50% by weight, the matting effect may be insufficient (the haze may be low), whereas when it exceeds 80% by weight, the appearance may deteriorate (the number of fisheyes may increase).

Component (B) has a structural unit derived from propylene in addition to a structural unit derived from ethylene, and the content of the structural unit derived from propylene is 20 to 50% by weight, preferably 20 to 45% by weight, and more preferably 20 to 40% by weight, wherein the sum total of the content of the structural unit derived from ethylene and the content of the structural unit derived from propylene is 100% by weight.

The content of Component (A) in the propylene-based copolymer of the present invention is 60 to 90% by weight, and the content of Component (B) is 10 to 40% by weight, wherein the sum total of Component (A) and Component (B) is 100% by weight. Preferably the content of Component (A) is 60 to 87% by weight and the content of Component (B) is 13 to 40% by weight, and more preferably, the content of Component (A) is 65 to 85% by weight and the content of Component (B) is 15 to 35% by weight. When the content of Component (A) is less than 60% by weight (in other words, the content of Component (B) exceeds 40% by weight), rigidity may deteriorate, and when the content of Component (A) exceeds 90% by weight (in other words, the content of Component (B) is less than 10% by weight), the matting effect may become insufficient (that is, the haze may be low).

The intrinsic viscosity of Component (A) in the propylene-based copolymer of the present invention (hereinafter, sometimes referred to as "[η]A") is preferably 0.9 to 3.5 dL/g, and more preferably 1.0 to 3.5 dL/g, and even more preferably 1.0 to 3.1 dL/g. When [η]A is less than 0.9 dL/g, the appearance may deteriorate (that is, the number of fisheyes may increase), and when [η]A exceeds 3.5 dL/g, the flowability is low, so that the workability may deteriorate.

The intrinsic viscosity of Component (B) in the propylene-based copolymer of the present invention (hereinafter, sometimes referred to as "[η]B") is preferably 1.8 to 4.5 dL/g, and more preferably 2.0 to 4.5 dL/g, and even more preferably 2.0 to 4.0 dL/g. When the [η]B is less than 1.8 dL/g, the matting effect may become insufficient (that is, the haze may be low), whereas when the [η]B exceeds 4.5 dL/g, the appearance may deteriorate (that is, the number of fisheyes may increase). In the present invention, the intrinsic viscosities of Component (A) and Component (B) of a propylene-based copolymer are measured in tetralin of 135° C. by using an Ubbelohde viscometer.

The ratio of [η]B to the intrinsic viscosity of Component (A) in the propylene-based copolymer of the present invention (hereinafter, sometimes referred to as "[η]B/[η]A") is within the range of $1.3<[η]B/[η]A\leq2.0$, preferably $1.4\leq[η]B/[η]A\leq2.0$, and more preferably $1.4\leq[η]B/[η]A\leq1.8$. When the [η]B/[η]A is 1.3 or less, the matting effect may become insufficient (that is, the haze may be low), whereas when it exceeds 2.0, the appearance may deteriorate (that is, the number of fisheyes may increase).

The melt flow rate of the propylene-based copolymer of the present invention is not less than 5 g/10 minutes and not more than 30 g/10 minutes, preferably not less than 5 g/10 minutes and not more than 20 g/10 minutes, and more preferably not less than 5 g/10 minutes and less than 10 g/10 minutes. When the melt flow rate of a propylene-based copolymer is less than 5 g/10 minutes, the flowability is low, so that the workability may deteriorate, and when it exceeds 30 g/10 minutes, the appearance may deteriorate (that is, the number of fisheyes may increase). In the present invention, the melt flow rate of a propylene-based copolymer is measured at a temperature of 230° C. and a load of 21.18 N in accordance with JIS K7210. The melt flow rate of the propylene-based copolymer of the present invention can be adjusted by adding a molecular weight regulator, such as hydrogen gas and metal compounds, and ethylene in a proper amount in each step of polymerization, or by adjusting polymerization conditions, such as temperature and pressure in the polymerization.

The method for producing the propylene-based copolymer of the present invention may be, for example, a method of polymerizing raw materials, i.e., propylene, ethylene, and the so on, using a conventional stereoregular catalyst.

Examples of the stereoregular catalyst include a catalyst that is formed by bringing a solid titanium-containing catalyst component, an organometallic compound catalyst component, and an electron donor that is further used according to need into contact with each other, a catalyst system that is formed by bringing a compound of a transition metal of Group 4 of the periodic table which compound has a cyclopentadienyl ring, and an alkyl aluminoxane into contact with each other, and a catalyst that is formed by bringing a compound of a transition metal of Group 4 of the periodic table which compound has a cyclopentadienyl ring, and a compound capable of reacting with the compound of the transition metal to form an ionic complex, and an organoaluminum compound into contact with each other. Particularly preferred is the catalyst that is formed by bringing a solid titanium-containing catalyst component, an organometallic compound catalyst component, and an electron donor that is further used according to need into contact with each other.

The solid titanium-containing catalyst component may be, for example, a trivalent titanium compound-containing solid catalyst component to be formed by bringing a solid catalyst component precursor obtained by reducing a titanium compound with an organomagnesium compound in the presence of a silicon compound, a halide compound (for example, titanium tetrachloride), and an electron donor (for example, an ether compound, and a mixture of an ether compound and an ester compound) into contact with each other.

Examples of the organometallic compound catalyst component include organoaluminum compounds each having at least one aluminum-carbon bond in the molecule, and preferably the organometallic compound catalyst component is preferably trialkylaluminum, a mixture of trialkylaluminum and dialkylaluminum halide, or alkylalumoxane, and more preferably triethylaluminum, triisobutylaluminum, a mixture of triethylaluminum and diethylaluminum chloride, or tetraethyldialumoxane.

Examples of the electron donor include oxygen-containing compounds, nitrogen-containing compounds, phosphorus-containing compounds, and sulfur-containing compounds; oxygen-containing compounds or nitrogen-containing compounds are preferred, oxygen-containing compounds are more preferred, and alkoxysilicons or ethers are even more preferred.

One specific example is a catalyst to be formed by bringing a trivalent titanium compound-containing solid catalyst component (hereinafter, sometimes referred to as "Component (a)"), an organoaluminum compound (hereinafter, sometimes referred to as "Component (b)"), and a silicon compound having an Si—$OR^2$ bond ($R^2$ represents a hydrocarbon group having 1 to 20 carbon atoms) (hereinafter, sometimes referred to as "Component (c)") into contact with each other, wherein the trivalent titanium compound-containing solid catalyst component is obtained by bringing an ester compound, an ether compound, titanium tetrachloride, and a solid product to be obtained by reducing a titanium compound represented by a formula Ti(OR1)nX4-n (R1 represents a hydrocarbon group having 1 to 20 carbon atoms, x represents a halogen atom, and n represents a number satisfying $0<n\leq4$) with an organomagnesium compound in the presence of a silicon compound having an Si—O bond, into contact with each other.

The used amount of the organoaluminum compound is usually from 1 to 2000, preferably from 5 to 1500 in molar ratio of Al atoms in Component (b)/Ti atoms in Component (a), and usually from 0.02 to 500, preferably from 0.05 to 50 in molar ratio of Component (c)/Al atoms in Component (b).

The polymerization method for producing the propylene-based copolymer of the present invention may be performed by a batch system (a system to charge raw materials into one reactor to make them react) or may be performed by a continuous system (a system of performing reaction in reactors which are interconnected). Further examples are slurry polymerization or solution polymerization using such an inert hydrocarbon solvent as propane, butane, isobutane, pentane, hexane, heptane, and octane, bulk polymerization using an olefin that is liquid at a polymerization temperature, or vapor phase polymerization, and a bulk-vapor phase polymerization method in which the foregoing are carried out continuously; preferred from the viewpoint of productivity is a method in which a polymer component whose main component is a structural unit derived from propylene (Component (A)) is produced in a first step, and subsequently a propylene-ethylene copolymer component (Component (B)) is produced by polymerizing propylene and ethylene in a vapor phase in a second step. The polymerization temperature is usually −30 to 300° C., and preferably 20 to 180° C. From the industrial and economical viewpoints, the polymerization pressure is usually ordinary pressure to 10 MPa, and preferably 200 kPa to 5 MPa. Particularly, the below-described second step is preferably vapor phase polymerization.

Examples of the method for adjusting the intrinsic viscosities and ethylene contents of the polymer component whose main component is a structural unit derived from propylene (Component (A)) and the propylene-ethylene copolymer component (Component (B)) of the propylene-based copolymer include a method of adding a molecular weight regulator, such as hydrogen gas and metal compounds, and ethylene in a proper amount in each step of polymerization, and a method of adjusting the temperature, the pressure or the like in polymerization.

The contents of the polymer component whose main component is a structural unit derived from propylene (Component (A)) and the propylene-ethylene copolymer component (Component (B)) of the propylene-based copolymer can be controlled by the polymerization time, the size of a polymerization vessel, the retained amount of a polymer in a polymerization vessel, the polymerization temperature, the polymerization pressure, and the like in the production of the propylene-based copolymer. According to need, drying may be done at a temperature not higher than a temperature at which polypropylene melts in order to remove the residual solvent of the polypropylene, the oligomer of a super-low molecular weight produced as a by-product during the production, and so on. Examples of the drying method include those disclosed in JP 55-75410 A and Japanese Patent No. 2565753.

If necessary, the propylene-based copolymer of the present invention may form a propylene-based resin composition with the addition of additives and other resins. Examples of the additives include antioxidants, UV absorbers, antistatic agents, lubricants, nucleating agents, pressure-sensitive adhesives, anticlouding agents, and antiblocking agents. As to the compounded amount in the case of adding an additive, the amount of the additive is preferably 0.001 to 5 parts by weight, more preferably 0.01 to 2 parts by weight relative to 100 parts by weight of the propylene-based copolymer. As to the compounded amount in the case of adding another resin, the amount of the resin is preferably 0.5 to 30 parts by weight, more preferably 1 to 25 parts by weight relative to 100 parts by weight of the propylene-based copolymer.

For the purpose of improving the matting effect, it is permissible to make the propylene-based copolymer of the present invention contain a phenolic antioxidant or a phosphorus-containing antioxidant.

Examples of the above-mentioned phenolic antioxidant include hindered phenol antioxidants or mono-hindered phenol antioxidants, such as 2,6-di-tert-butyl 4-methylphenol, tetrakis[methylene-3(3',5'-di-tert-butyl 4-hydroxyphenyl) propionate]methane, octadecyl-3-(3,5-di-tert-butyl-4-hydroxyphenyl)propionate, 3,9-bis[2-{3-(3-tert-butyl-4-hydroxy-5-methylphenyl)propionyloxy}-1,1-dimethylethyl]-2,4,8,10-tetraoxaspiro[5•5]undecane, 1,3,5-tris-2[3(3,5-di-tert-butyl-4-hydroxyphenyl)propionyloxy]ethyl isocyanate, 1,3,5-trimethyl-2,4,6-tris(3,5-di-tert-butyl-4-hydroxybenzyl)benzene, tris(3,5-di-tert-butyl-4-hydroxybenzyl)isocyanurate, 1,3,5-tris(4-tert-butyl-3-hydroxy-2,6-dimethylbenzyl)isocyanurate, pentaerythrityl-tetrakis[3-(3,5-di-tert-butyl-4-hydroxyphenyl)propionate], triethylene glycol-N-bis-3-(3-tert-butyl-5-methyl-4-hydroxyphenyl)propionate, 1,6-hexanediol bis[(3-(3,5-di-tert-butyl-4-hydroxyphenyl) propionate)], 2,2-thiobis-diethylene bis[(3-(3,5-di-tert-butyl-4-hydroxyphenyl)propionate)], 2,2'-methylene-bis-(4-methyl-6-tert-butylphenol), 2,2'-methylene-bis-(4-ethyl-6-tert-butylphenol), 2,2'-methylene-bis-(4,6-di-tert-butylphenol), 2,2'-ethylidene-bis-(4,6-di-tert-butylphenol) (CHEMINOX 1129), 2,2'-butylidene-bis-(4-methyl-6-tert-butylphenol), 4,4'-butylidenebis(3-methyl-6-t-butylphenol), 2-tert-butyl-6-(3-tert-butyl-2-hydroxy-5-methylbenzyl)-4-methylphenyl acrylate, 2,4-di-tert-amyl-6-(1-(3,5-di-tert-amyl-2-hydroxyphenyl)ethyl)phenyl acrylate, and α-tocopherols represented by vitamin E. may be mentioned.

Examples of the above-mentioned phosphorus-containing antioxidant include triphenyl phosphite, tris(nonylphenyl) phosphite, tris(2,4-di-tert-butylphenyl)phosphite, trilauryl phosphite, trioctadecyl phosphite, distearyl pentaerythritol diphosphite, diisodecyl pentaerythritol diphosphite, bis(2,4-di-tert-butylphenyl)pentaerythritol diphosphite, bis(2,4-di-tert-butyl-6-methylphenyl)pentaerythritol diphosphite, bis (2,6-di-tert-butyl-4-methylphenyl)pentaerythritol diphosphite, bis(2,4,6-tri-tert-buthylphenyl)pentaerythritol diphosphite, tristearyl sorbitol triphosphite, tetrakis(2,4-di-tert-butylphenyl)-4,4'-diphenylene diphosphite, 2,2'-methylenebis(4,6-di-tert-butylphenyl)-2-ethylhexyl phosphite, 2,2'-ethylidenebis(4,6-di-tert-butylphenyl)fluorophosphite, bis (2,4-di-tert-butyl-6-methylphenyl)ethyl phosphite, bis(2,4-di-tert-butyl 6-methylphenyl)methyl phosphite, 2-(2,4,6-tri-tert-butylphenyl)-5-ethyl-5-butyl-1,3,2-oxaphosphorinane, 2,2',2"-nitrilo[triethyl-tris(3,3',5,5'-tetra-tert-butyl-1,1'-biphenyl-2,2'-diyl)phosphite], 2,4,8,10-tetra-tert-butyl-6-[3-(3-methyl-4-hydroxy-5-tert-butylphenyl)propoxy]dibenzo [d,f][1,3,2]dioxaphosphepin, and mixtures of at least two species of these.

Examples of the other resin include olefin-based resins, such as polyethylene, and elastomers which are copolymers of ethylene and an α-olefin, which may be either products produced using heterogeneous catalysts or products produced using homogeneous catalysts (e.g., metallocene catalysts). Moreover, styrene-based copolymer rubbers produced by hydrogenating styrene-butadiene-styrene copolymers or styrene-isoprene-styrene copolymers are mentioned.

The propylene-based copolymer of the present invention or the above-mentioned propylene-based resin composition is usually melt-kneaded before being formed into a film. The MFR ratio of the propylene-based copolymer of the present invention or the above-mentioned propylene-based resin composition (i.e., the MFR of the propylene-based copolymer (propylene-based resin composition) after melt-kneading/the MFR of the propylene-based copolymer (propylene-based resin composition) before melt-kneading) is preferably from 0.7 to 3.5, more preferably from 0.8 to 3.0, and even more preferably from 0.8 to 2.0 from the viewpoint of excelling in workability and appearance. In the case of using the above-mentioned propylene-based resin composition for melt-kneading, the MFR of the propylene-based copolymer after the melt-kneading means the value of MFR of the propylene-based resin composition obtained after the melt-kneading.

The above-mentioned melt-kneading can be performed by using a conventional method and a conventional machine. Examples of the method include a method in which the propylene-based copolymer and various additives are mixed with a mixing device, such as a Henschel mixer, a ribbon blender, and a tumble mixer, and then are melt-knead; and a method in which the propylene-based copolymer and various additives are fed, respectively, at a certain rate continuously by means of a metering feeder to obtain a uniform mixture, and then the mixture is melt-kneaded by using an extruder equipped with a single screw or two or more screws, a Banbury mixer, a roll type kneading machine, or the like.

The above-mentioned melt kneading temperature is preferably 180° C. to 350° C., more preferably 180° C. to 320° C., and even more preferably 180° C. to 300° C.

The film of the present invention may be either a single layer film or a multilayer film containing at least one layer made of a film of the present invention. The film of the present invention may be either an unstretched film or a stretched film produced by stretching a polypropylene-based film of the present invention. Preferably, it is an unstretched film.

Multilayer films are films each composed of a layer of a film of the present invention and other layer or layers, and examples of the other layer or layers include a layer composed of a propylene homopolymer or a layer of a propylene-based random copolymer composed of propylene and at least one comonomer selected from the group consisting of ethylene and α-olefins having 4 or more carbon atoms, a block copolymer composed of propylene and at least one comonomer selected from the group consisting of ethylene and α-olefins having 4 or more carbon atoms, and a layer composed of a mixture of at least one propylene-based polymer selected from the group consisting of the aforementioned propylene homopolymer, the aforementioned propylene-based random copolymer, and the aforementioned propylene-based block copolymer and at least one macromolecular substance selected from the group consisting of olefin based resins, such as polyethylene and polybutene, and an elastomer that is a copolymer of ethylene and an α-olefin, a layer of a biaxially stretched polypropylene film, a layer of an unstretched or stretched nylon film, and a layer of a stretched poly(ethyl terephthalate) film.

The film of the present invention can be produced by, for example, a T-die method, an inflation method, a calendering method, or the like when the film is a single layer film. When the film of the present invention is a multilayer film, it can be produced by, for example, a co-extrusion processing method, an extrusion laminating method, a heat lamination method, and a dry lamination method.

The film of the present invention is preferably 5 to 500 μm, more preferably 5 to 100 μm in thickness.

The film of the present invention may be subjected to surface treatment, such as corona discharge treatment, flame treatment, plasma treatment and ozonization, by a method conventionally used in the industry.

The applications of the film of the present invention include packaging applications, for example, applications for packaging foods, fibers, miscellaneous goods, and the like. The film of the present invention is preferably a matte film. The haze that is suitable as a matte film is typically 65% or more, and preferably 70% or more. The haze of the film of the present invention can be adjusted through the adjustment of, for example, the content of a structural unit derived from ethylene in Component (B), the content of Component (B), the intrinsic viscosity of Component (B), or the ratio of the intrinsic viscosity of Component (B) to the intrinsic viscosity of Component (A). Moreover, it can be adjusted also by adjusting processing conditions used in the production of a film from a propylene-based copolymer of the present invention. The haze is measured in accordance with JIS K7105.

EXAMPLES

The present invention is described below by way of Examples and Comparative Examples. The measurements of the respective items disclosed in Examples and Comparative Examples were measured by the following methods.

(1) Contents (unit: % by weight) of a polymer component whose major structural unit is a structural unit derived from propylene (Component (A)) and a propylene-ethylene copolymer component whose content of a structural unit derived from ethylene is 50 to 80% by weight (Component (B))

The content of Component (A) (hereinafter, sometimes referred to as "$P_A$") and the content of Component (B) (hereinafter, sometimes referred to as "$P_B$") were determined from the mass balance in the production of Component (A) and Component (B) of a propylene-based copolymer.

(2) Ethylene content (unit: % by weight) of a propylene-ethylene copolymer component (Component (B)) of a propylene-based copolymer The IR spectrum of the whole body of a propylene-based copolymer was measured and the ethylene content of Component (B) was determined from the following Formula (1) in accordance with the method concerning (ii) a block copolymer disclosed on page 616 of Polymer Analysis Handbook (1995, Kinokuniya Co. Ltd.):

$$E_B=(E_T-E_A \times P_A)/P_B \qquad \text{Formula (1)}$$

wherein $E_T$, $E_A$, and $E_B$ represent the ethylene contents of the whole body of the propylene-based copolymer, Component (A), and Component (B), respectively, and $P_A$ and $P_B$ represent the contents of Component (A) and Component (B), respectively.

(3) Intrinsic viscosity ([η], unit: dL/g)

Measurement was performed in 135° C. tetralin using an Ubbelohde viscometer.

(3-1) Intrinsic viscosities ([η]A, [η]B) of Component (A) and Component (B)

The intrinsic viscosity ([η]B) of Component (B) was calculated from the following Formula (2) by using the intrinsic viscosity ([η]A) of Component (A) sampled at the completion of the polymerization of the polymerization step (4) described below, the intrinsic viscosity of the whole body of a copolymer obtained after the completion of the polymerization of the polymerization step (5) described below (hereinafter, sometimes referred to as "[η]T"), and the content ($P_A$) of Component (A) and the content ($P_B$) of Component (B).

$$[\eta]A \times P_A/100 + [\eta]B \times P_B/100 = [\eta]T \qquad \text{Formula (2)}$$

(4) Melt flow rate (MFR, unit: g/10 min)

The melt flow rate of a propylene-based copolymer was measured at a temperature of 230° C. and a load of 21.18 N in accordance with JIS K7210.

(5) Haze (unit: %) and glossiness (unit: %)

The measurement was carried out in accordance with JIS K7105.

(6) Rigidity (Young's modulus, unit: MPa)

Using a film (120 mm×30 mm) (sampled so that the film formation direction (MD) might match the longer side direction), a tensile test was done at a clamp distance of 60 mm and a tensile speed of 5 mm in an atmosphere of 23° C. and a 50% humidity by the use of an AUTOSTRAIN manufactured by Yasuda Seiki Seisakusho, Ltd., and an initial elastic modulus was determined from the slope of the tangent of a tensile-stress curve at its zero point.

(7) Appearance evaluation (the quantity of fisheye, unit: fisheyes/100 cm2)

For a film having a thickness of 30 μm, fisheyes having a diameter of 50 μm or more were counted by using a digital defect inspection device (GX70LT manufactured by Mamiya-OP Co., Ltd.). The inspection conditions include an inspection threshold: 30 or more, a light source gain: 1.0, a reading speed: 30 m/min, a minimum detection size: 4 pixels in length and 2 pixels in width, an average transmitted light amount: 60%, and a measurement range: 17 cm in length and 12 cm in width.

Example 1

Production Example of Propylene-Based Copolymer PP-I

[Synthesis of Solid Catalyst]

A solid catalyst was synthesized by the method disclosed in Example 1 of JP 2009-173870 A.

[Preliminary Polymerization]

Into a SUS autoclave having a capacity of 3 L and equipped with a stirrer, 1.5 L of n-hexane which had been fully dehydrated and degassed, 20 mmol of triethylaluminum, 2.0 mmol of cyclohexylethyldimethoxysilane and 16 g of the above-mentioned solid catalyst were added. Preliminary polymerization was conducted by feeding 32 g of propylene continuously over about 40 minutes while the temperature in the autoclave was kept at about 5 to 10° C. Then, the preliminarily polymerized slurry was transferred to a SUS autoclave having a capacity of 200 L and equipped with a stirrer, and 132 L of liquid butane was added thereto, affording a slurry of a preliminarily polymerized catalyst component.

Production of Component (A)

[Polymerization Step (1)]

In a vessel type reactor having a capacity of 40 L and equipped with a stirrer, continuous polymerization was carried out for 0.48 hours by continuously feeding propylene, hydrogen, triethylaluminum, cyclohexylethyl dimethoxysilane, and the slurry of the preliminarily polymerized catalyst component, maintaining the polymerization temperature at 78° C., the stirring rate at 150 rpm, and the amount of the liquid in the reactor at 18 L, and adjusting the feeding rate of propylene to 15 kg/hour, the feeding rate of hydrogen to 21.6 NL/hour, the feeding rate of triethylaluminum to 40 mmol/hour, the feeding rate of cyclohexylethyldimethoxysilane to 6 mmol/hour, and the feeding rate of the slurry of the preliminarily polymerized catalyst component, in terms of the solid catalyst component, to 0.39 g/hour. A polymer was discharged at a rate of 3.9 kg/hour.

[Polymerization Step (2)]

The slurry discharged from the reactor in the polymerization step (1) was transferred continuously to a vessel type reactor other than that of the polymerization step (1), and continuous polymerization was further carried out for 0.95 hours by continuously feeding propylene and hydrogen, maintaining the polymerization temperature at 75° C., the stirring rate at 150 rpm, and the amount of the liquid in the reactor at 44 L, and adjusting the feeding rate of propylene to 7 kg/hour and the feeding rate of hydrogen to 6.3 NL/hour. A polymer was discharged at a rate of 5.7 kg/hour.

[Polymerization Step (3)]

The slurry discharged from the reactor in the polymerization step (2) was transferred continuously to a vessel type reactor other than those of the polymerization steps (1) and (2), and continuous polymerization was further carried out for 0.84 hours by maintaining the polymerization temperature at 70° C., the stirring rate at 150 rpm, and the amount of the liquid in the reactor at 44 L. A polymer was discharged at a rate of 3.5 kg/hour.

[Polymerization Step (4)]

The slurry discharged from the reactor in the polymerization step (3) was transferred continuously to a fluidized bed reactor having a capacity of 1 m³ and equipped with a stirrer, and polymerization was carried out for 2.7 hours by continuously feeding propylene and hydrogen, and adjusting the polymerization temperature to 80° C., the polymerization pressure to 1.8 MPa, and the concentration ratio of propylene to hydrogen of the gas in the reactor to 98.14 volume %/1.86 volume % (propylene concentration/hydrogen concentration). A polymer component (Component A) was discharged at a rate of 5.6 kg/hour. The intrinsic viscosities (MA) of the resulting polymer component (Component (A)) was 1.56 dL/g.

Production of Component (B)

[Polymerization Step (5)]

The polymer component (Component (A)) discharged from the reactor in the polymerization step (4) was transferred continuously to a fluidized bed reactor having a capacity of 1 m³ and equipped with a stirrer, which reactor was a reactor other than the reactor used in the polymerization step (4), and polymerization was carried out for 2.0 hours by continuously feeding propylene, ethylene, and hydrogen, adjusting the polymerization temperature to 70° C., the polymerization pressure to 1.4 MPa, and the concentration ratio of propylene to ethylene to hydrogen of the gas in the reactor to 49.2 volume %/45.8 volume %/5.0 volume % (propylene concentration/ethylene level/hydrogen concentration), and adding oxygen as a deactivator at a molar ratio relative to the triethylaluminum being fed in the polymerization step (1) of 0.003. A propylene-based copolymer was discharged at a rate of 5.7 kg/hour. The thus-obtained propylene-based copolymer is called propylene-based copolymer PP-I. The intrinsic viscosities (MT) of the resulting propylene-based copolymer was 1.80 dL/g.

The results of analysis of the resulting propylene-based copolymer are given in Table 1.

Example 2

Production Example of Propylene-Based Copolymer PP-II

Polymerization was carried out in the same manner as for PP-I except for carrying out polymerization for 2.1 hours by adjusting the concentration ratio of propylene to ethylene to hydrogen of the gas in the reactor to 39.1 volume %/55.0 volume %/5.9 volume % (propylene concentration/ethylene level/hydrogen concentration), and adding oxygen as a deactivator at a molar ratio relative to the triethylaluminum being fed in the polymerization step (1) of 0.004 in [Polymerization step (5)] of the above-described Polymerization example of PP-I. Thus, propylene-based copolymer PP-II was produced.

The results of analysis of the resulting propylene-based copolymer are given in Table 1.

Example 3

Production Example of Propylene-Based Copolymer PP-III

Polymerization was carried out in the same manner as for PP-I except for carrying out polymerization for 2.2 hours by adjusting the concentration ratio of propylene to ethylene to hydrogen of the gas in the reactor to 29.4 volume %/63.7 volume %/6.9 volume % (propylene concentration/ethylene level/hydrogen concentration), and adding oxygen as a deactivator at a molar ratio relative to the triethylaluminum being fed in the polymerization step (1) of 0.01 in [Polymerization step (5)] of the above-described Polymerization example of PP-I. Thus, propylene-based copolymer PP-III was produced.

The results of analysis of the resulting propylene-based copolymer are given in Table 1.

Comparative Example 1

Production Example of Propylene-Based Copolymer PP-IV

Polymerization was carried out in the same manner as for PP-I except for carrying out polymerization for 2.1 hours by adjusting the concentration ratio of propylene to ethylene to hydrogen of the gas in the reactor to 33.7 volume %/63.7 volume %/2.6 volume % (propylene concentration/ethylene level/hydrogen concentration), and adding oxygen as a deactivator at a molar ratio relative to the triethylaluminum being fed in the polymerization step (1) of 0.0024 in [Polymerization step (5)] of the above-described Polymerization example of PP-I. Thus, propylene-based copolymer PP-IV was produced.

The results of analysis of the resulting propylene-based copolymer are given in Table 1.

Comparative Example 2

Production Example of Propylene-Based Copolymer PP-V

The synthesis of a solid catalyst and preliminary polymerization were carried out in the same way as PP-I.
Production of Component (A)
[Polymerization Step (1)]

In a vessel type reactor having a capacity of 40 L and equipped with a stirrer, continuous polymerization was carried out for 0.4 hours by continuously feeding propylene, hydrogen, triethylaluminum, cyclohexylethyl dimethoxysilane, and the slurry of the preliminarily polymerized catalyst component, maintaining the polymerization temperature at 78° C., the stirring rate at 150 rpm, and the amount of the liquid in the reactor at 18 L, and adjusting the feeding rate of propylene to 15 kg/hour, the feeding rate of hydrogen to 30 NL/hour, the feeding rate of triethylaluminum to 40 mmol/hour, the feeding rate of cyclohexylethyldimethoxysilane to 6 mmol/hour, and the feeding rate of the slurry of the preliminarily polymerized catalyst component, in terms of the solid catalyst component, to 0.52 g/hour. A polymer was discharged at a rate of 3.9 kg/hour.
[Polymerization Step (2)]

The slurry discharged from the reactor in the polymerization step (1) was transferred continuously to a vessel type reactor other than that of the polymerization step (1), and continuous polymerization was further carried out for 0.9 hours by continuously feeding propylene and hydrogen, maintaining the polymerization temperature at 75° C., the stirring rate at 150 rpm, and the amount of the liquid in the reactor at 44 L, and adjusting the feeding rate of propylene to 7 kg/hour and the feeding rate of hydrogen to 10 NL/hour. A polymer was discharged at a rate of 5.4 kg/hour.
[Polymerization Step (3)]

The slurry discharged from the reactor in the polymerization step (2) was transferred continuously to a vessel type reactor other than those of the polymerization steps (1) and (2), and continuous polymerization was further carried out for 0.8 hours by maintaining the polymerization temperature at 70° C., the stirring rate at 150 rpm, and the amount of the liquid in the reactor at 44 L. A polymer was discharged at a rate of 3.3 kg/hour.

[Polymerization Step (4)]

The slurry discharged from the reactor in the polymerization step (3) was transferred continuously to a fluidized bed reactor having a capacity of 1 m$^3$ and equipped with a stirrer, and polymerization was carried out for 2.6 hours by continuously feeding propylene and hydrogen, and adjusting the polymerization temperature to 80° C., the polymerization pressure to 1.8 MPa, and the concentration ratio of propylene to hydrogen of the gas in the reactor to 97.0 volume %/3.0 volume % (propylene concentration/hydrogen concentration). A polymer component (Component A) was discharged at a rate of 7 kg/hour. The intrinsic viscosities (MA) of the resulting polymer component (Component (A)) was 1.39 dL/g.
Production of Component (B)
[Polymerization step (5)]

The polymer component (Component (A)) discharged from the reactor in the polymerization step (4) was transferred continuously to a fluidized bed reactor having a capacity of 1 m$^3$ and equipped with a stirrer, which reactor was a reactor other than the reactor used in the polymerization step (4), and polymerization was carried out for 2.2 hours by continuously feeding propylene, ethylene, and hydrogen, adjusting the polymerization temperature to 70° C., the polymerization pressure to 1.4 MPa, and the concentration ratio of propylene to ethylene to hydrogen of the gas in the reactor to 27.5 volume %/68 volume %/4.5 volume % (propylene concentration/ethylene level/hydrogen concentration), and adding oxygen as a deactivator at a molar ratio relative to the triethylaluminum being fed in the polymerization step (1) of 0.067. A propylene-based copolymer was discharged at a rate of 4.3 kg/hour. The thus-obtained propylene-based copolymer is called propylene-based copolymer PP-V. The intrinsic viscosities ([η]T) of the resulting propylene-based copolymer was 1.69 dL/g.

The results of analysis of the resulting propylene-based copolymer are given in Table 1.

Comparative Example 3

Production Example of Propylene-Based Copolymer PP-VI

The synthesis of a solid catalyst and preliminary polymerization were carried out in the same way as PP-I.
Production of Component (A)
[Polymerization Step (1)]

In a vessel type reactor having a capacity of 40 L and equipped with a stirrer, continuous polymerization was carried out for 0.46 hours by continuously feeding propylene, hydrogen, triethylaluminum, cyclohexylethyl dimethoxysilane, and the slurry of the preliminarily polymerized catalyst component, maintaining the polymerization temperature at 78° C., the stirring rate at 150 rpm, and the amount of the liquid in the reactor at 18 L, and adjusting the feeding rate of propylene to 15 kg/hour, the feeding rate of hydrogen to 2.3 NL/hour, the feeding rate of triethylaluminum to 40 mmol/hour, the feeding rate of cyclohexylethyldimethoxysilane to 6 mmol/hour, and the feeding rate of the slurry of the preliminarily polymerized catalyst component, in terms of the solid catalyst component, to 0.45 g/hour. A polymer was discharged at a rate of 3.2 kg/hour.
[Polymerization Step (2)]

The slurry discharged from the reactor in the polymerization step (1) was transferred continuously to a vessel type reactor other than that of the polymerization step (1), and continuous polymerization was further carried out for 0.9 hours by continuously feeding propylene and hydrogen, maintaining the polymerization temperature at 74° C., the stirring rate at 150 rpm, and the amount of the liquid in the reactor at 44 L, and adjusting the feeding rate of propylene to 7 kg/hour and the feeding rate of hydrogen to 0.66 NL/hour. A polymer was discharged at a rate of 4.9 kg/hour.

[Polymerization Step (3)]

The slurry discharged from the reactor in the polymerization step (2) was transferred continuously to a vessel type reactor other than those of the polymerization steps (1) and (2), and continuous polymerization was further carried out for 0.8 hours by maintaining the polymerization temperature at 70° C., the stirring rate at 150 rpm, and the amount of the liquid in the reactor at 44 L. A polymer was discharged at a rate of 3.1 kg/hour.

[Polymerization Step (4)]

The slurry discharged from the reactor in the polymerization step (3) was transferred continuously to a fluidized bed reactor having a capacity of 1 m³ and equipped with a stirrer, and polymerization was carried out for 2.8 hours by continuously feeding propylene and hydrogen, and adjusting the polymerization temperature to 80° C., the polymerization pressure to 1.8 MPa, and the concentration ratio of propylene to hydrogen of the gas in the reactor to 99.81 volume %/0.19 volume % (propylene concentration/hydrogen concentration). A polymer component (Component A) was discharged at a rate of 6.5 kg/hour. The intrinsic viscosities ([η]A) of the resulting polymer component (Component (A)) was 2.30 dL/g.

Production of Component (B)

[Polymerization Step (5)]

The polymer component (Component (A)) discharged from the reactor in the polymerization step (4) was transferred continuously to a fluidized bed reactor having a capacity of 1 m³ and equipped with a stirrer, which reactor was a reactor other than the reactor used in the polymerization step (4), and polymerization was carried out for 2.2 hours by continuously feeding propylene, ethylene, and hydrogen, adjusting the polymerization temperature to 70° C., the polymerization pressure to 1.4 MPa, and the concentration ratio of propylene to ethylene to hydrogen of the gas in the reactor to 31.2 volume %/62 volume %/6.8 volume % (propylene concentration/ethylene level/hydrogen concentration), and adding oxygen as a deactivator at a molar ratio relative to the triethylaluminum being fed in the polymerization step (1) of 0.029. A propylene-based copolymer was discharged at a rate of 4.7 kg/hour. The thus-obtained propylene-based copolymer is called propylene-based copolymer PP-VI. The intrinsic viscosities (MT) of the resulting propylene-based copolymer was 2.30 dL/g.

The results of analysis of the resulting propylene-based copolymer are given in Table 1.

Example 4

To 100 parts by weight of propylene-based copolymer PP-I were mixed in advance 0.01 parts by weight of hydrotalcite (DHT4C, produced by Kyowa Chemical Industry Co., Ltd.), 0.075 parts by weight of SUMILIZER GP (2,4,8,10-tetra-tert-butyl-6-[3-(3-methyl-4-hydroxy-5-tert-butylphenyl)propoxy]dibenzo[d,f][1,3,2]dioxaphosphepin, produced by Sumitomo Chemical Co., Ltd.), 0.075 parts by weight of SUMILIZER GS (2,4-di-tert-amyl-6-[1-(3,5-di-tert-amyl-2-hydroxyphenyl)ethyl]phenyl acrylate, produced by Sumitomo Chemical Co., Ltd.), and 0.1 parts by weight of erucamide (NEUTRON-S, produced by Nippon Fine Chemical Co., Ltd.), and then the resultant was melt-kneaded at 250° C. by using a 40 mmϕ single screw extruder (Model VS40-28, manufactured by Tanabe Plastics Machinery Co., Ltd., equipped with a full flight screw), affording pellets. The resulting pellets had an MFR of 5.0 g/10 min.

The resulting pellets were subjected to melt extrusion at a resin temperature of 250° C. using a 50 mmϕ T-die film extruder (Film extruder V-50-F600, produced by Tanabe Plastics Machinery Co., Ltd., having a 400 mm wide T-die). The melt-extrudate was cooled over a chill roll in which 50° C. cooling water was circulated to obtain a film 30 μm in thickness. The MFR, the haze, the glossiness, the Young's modulus, and the appearance evaluation of the resulting film are given in Table 2.

Example 5

Pellets were obtained in the same way as Example 4 except for changing the propylene-based copolymer to PP-II. The resulting pellets had an MFR of 5.3 g/10 min.

The resulting pellets were melt-extruded in the same way as Example 4, affording a 30 μm-thick film. The MFR, the haze, the glossiness, the Young's modulus, and the appearance evaluation of the resulting film are given in Table 2.

Example 6

Pellets were obtained in the same way as Example 4 except for changing the propylene-based copolymer to PP-III. The resulting pellets had an MFR of 5.4 g/10 min.

The resulting pellets were melt-extruded in the same way as Example 4, affording a 30 μm-thick film. The MFR, the haze, the glossiness, the Young's modulus, and the appearance evaluation of the resulting film are given in Table 2.

Comparative Example 4

Pellets were obtained in the same way as Example 4 except for changing the propylene-based copolymer to PP-IV. The resulting pellets had an MFR of 4.0 g/10 min.

The resulting pellets were melt-extruded in the same way as Example 4, affording a 30 μm-thick film. The MFR, the haze, the glossiness, the Young's modulus, and the appearance evaluation of the resulting film are given in Table 2.

Comparative Example 5

Pellets were obtained in the same way as Example 4 except for changing the propylene-based copolymer to PP-V. The resulting pellets had an MFR of 9.0 g/10 min.

The resulting pellets were melt-extruded in the same way as Example 4, affording a 30 μm-thick film. The MFR, the haze, the glossiness, the Young's modulus, and the appearance evaluation of the resulting film are given in Table 2.

Comparative Example 6

Pellets were obtained in the same way as Example 4 except for changing the propylene-based copolymer to PP-VI. The resulting pellets had an MFR of 1.4 g/10 min.

The resulting pellets were melt-extruded in the same way as Example 4, affording a 30 μm-thick film. The MFR, the haze, the glossiness, the Young's modulus, and the appearance evaluation of the resulting film are given in Table 2.

Example 7

Production Example of Propylene-Based Copolymer PP-VII

The synthesis of a solid catalyst and preliminary polymerization were carried out in the same way as PP-I.

Production of Component (A)
[Polymerization Step (1)]

In a vessel type reactor having a capacity of 40 L and equipped with a stirrer, continuous polymerization was carried out for 0.47 hours by continuously feeding propylene, hydrogen, triethylaluminum, cyclohexylethyl dimethoxysilane, and the slurry of the preliminarily polymerized catalyst component, maintaining the polymerization temperature at 78° C., the stirring rate at 150 rpm, and the amount of the liquid in the reactor at 18 L, and adjusting the feeding rate of propylene to 15 kg/hour, the feeding rate of hydrogen to 24 NL/hour, the feeding rate of triethylaluminum to 40 mmol/hour, the feeding rate of cyclohexylethyldimethoxysilane to 6 mmol/hour, and the feeding rate of the slurry of the preliminarily polymerized catalyst component, in terms of the solid catalyst component, to 0.40 g/hour. A polymer was discharged at a rate of 4.0 kg/hour.

[Polymerization Step (2)]

The slurry discharged from the reactor in the polymerization step (1) was transferred continuously to a vessel type reactor other than that of the polymerization step (1), and continuous polymerization was further carried out for 0.92 hours by continuously feeding propylene and hydrogen, maintaining the polymerization temperature at 75° C., the stirring rate at 150 rpm, and the amount of the liquid in the reactor at 44 L, and adjusting the feeding rate of propylene to 7 kg/hour and the feeding rate of hydrogen to 8.8 NL/hour. A polymer was discharged at a rate of 5.3 kg/hour.

[Polymerization Step (3)]

The slurry discharged from the reactor in the polymerization step (2) was transferred continuously to a vessel type reactor other than those of the polymerization steps (1) and (2), and continuous polymerization was further carried out for 0.82 hours by maintaining the polymerization temperature at 70° C., the stirring rate at 150 rpm, and the amount of the liquid in the reactor at 44 L. A polymer was discharged at a rate of 3.2 kg/hour.

[Polymerization Step (4)]

The slurry discharged from the reactor in the polymerization step (3) was transferred continuously to a fluidized bed reactor having a capacity of 1 m$^3$ and equipped with a stirrer, and polymerization was carried out for 2.7 hours by continuously feeding propylene and hydrogen, and adjusting the polymerization temperature to 80° C., the polymerization pressure to 1.8 MPa, and the concentration ratio of propylene to hydrogen of the gas in the reactor to 98.1 volume %/1.9 volume % (propylene concentration/hydrogen concentration). A polymer component (Component A) was discharged at a rate of 5.8 kg/hour. The intrinsic viscosities ([η]A) of the resulting polymer component (Component (A)) was 1.48 dL/g.

Production of Component (B)
[Polymerization Step (5)]

The polymer component (Component (A)) discharged from the reactor in the polymerization step (4) was transferred continuously to a fluidized bed reactor having a capacity of 1 m$^3$ and equipped with a stirrer, which reactor was a reactor other than the reactor used in the polymerization step (4), and polymerization was carried out for 2.2 hours by continuously feeding propylene, ethylene, and hydrogen, adjusting the polymerization temperature to 70° C., the polymerization pressure to 1.4 MPa, and the concentration ratio of propylene to ethylene to hydrogen of the gas in the reactor to 48.4 volume %/48 volume %/3.6 volume % (propylene concentration/ethylene level/hydrogen concentration), and adding oxygen as a deactivator at a molar ratio relative to the triethylaluminum being fed in the polymerization step (1) of 0.0122. A propylene-based copolymer was discharged at a rate of 4.4 kg/hour. The thus-obtained propylene-based copolymer is called propylene-based copolymer PP-VII. The intrinsic viscosities ([η]T) of the resulting propylene-based copolymer was 1.71 dL/g.

The results of analysis of the resulting propylene-based copolymer are given in Table 1.

Example 8

Production Example of Propylene-Based Copolymer PP-VIII

The synthesis of a solid catalyst and preliminary polymerization were carried out in the same way as PP-I.

Production of Component (A)
[Polymerization Step (1)]

In a vessel type reactor having a capacity of 40 L and equipped with a stirrer, continuous polymerization was carried out for 0.46 hours by continuously feeding propylene, hydrogen, triethylaluminum, cyclohexylethyl dimethoxysilane, and the slurry of the preliminarily polymerized catalyst component, maintaining the polymerization temperature at 78° C., the stirring rate at 150 rpm, and the amount of the liquid in the reactor at 18 L, and adjusting the feeding rate of propylene to 15 kg/hour, the feeding rate of hydrogen to 24 NL/hour, the feeding rate of triethylaluminum to 40 mmol/hour, the feeding rate of cyclohexylethyldimethoxysilane to 6 mmol/hour, and the feeding rate of the slurry of the preliminarily polymerized catalyst component, in terms of the solid catalyst component, to 0.39 g/hour. A polymer was discharged at a rate of 3.8 kg/hour.

[Polymerization Step (2)]

The slurry discharged from the reactor in the polymerization step (1) was transferred continuously to a vessel type reactor other than that of the polymerization step (1), and continuous polymerization was further carried out for 0.91 hours by continuously feeding propylene and hydrogen, maintaining the polymerization temperature at 75° C., the stirring rate at 150 rpm, and the amount of the liquid in the reactor at 44 L, and adjusting the feeding rate of propylene to 7 kg/hour and the feeding rate of hydrogen to 8.8 NL/hour. A polymer was discharged at a rate of 5.1 kg/hour.

[Polymerization Step (3)]

The slurry discharged from the reactor in the polymerization step (2) was transferred continuously to a vessel type reactor other than those of the polymerization steps (1) and (2), and continuous polymerization was further carried out for 0.81 hours by maintaining the polymerization temperature at 70° C., the stirring rate at 150 rpm, and the amount of the liquid in the reactor at 44 L. A polymer was discharged at a rate of 3.0 kg/hour.

[Polymerization Step (4)]

The slurry discharged from the reactor in the polymerization step (3) was transferred continuously to a fluidized bed reactor having a capacity of 1 m$^3$ and equipped with a stirrer, and polymerization was carried out for 2.9 hours by continuously feeding propylene and hydrogen, and adjusting the polymerization temperature to 80° C., the polymerization pressure to 1.8 MPa, and the concentration ratio of propylene to hydrogen of the gas in the reactor to 98 volume %/2 volume % (propylene concentration/hydrogen concentration). A polymer component (Component A) was discharged at a rate of 5.2 kg/hour. The intrinsic viscosities ([η]A) of the resulting polymer component (Component (A)) was 1.48 dL/g.

Production of Component (B)
[Polymerization Step (5)]

The polymer component (Component (A)) discharged from the reactor in the polymerization step (4) was transferred continuously to a fluidized bed reactor having a capacity of 1 m³ and equipped with a stirrer, which reactor was a reactor other than the reactor used in the polymerization step (4), and polymerization was carried out for 2.4 hours by continuously feeding propylene, ethylene, and hydrogen, adjusting the polymerization temperature to 70° C., the polymerization pressure to 1.4 MPa, and the concentration ratio of propylene to ethylene to hydrogen of the gas in the reactor to 28.1 volume %/66 volume %/5.9 volume % (propylene concentration/ethylene level/hydrogen concentration), and adding oxygen as a deactivator at a molar ratio relative to the triethylaluminum being fed in the polymerization step (1) of 0.0122. A propylene-based copolymer was discharged at a rate of 3.9 kg/hour. The thus-obtained propylene-based copolymer is called propylene-based copolymer PP-VIII. The intrinsic viscosities (MT) of the resulting propylene-based copolymer was 1.65 dL/g.

The results of analysis of the resulting propylene-based copolymer are given in Table 1.

Comparative Example 7

Production Example of Propylene-Based Copolymer PP-IX

The synthesis of a solid catalyst and preliminary polymerization were carried out in the same way as PP-I.
Production of Component (A)
[Polymerization Step (1)]

In a vessel type reactor having a capacity of 40 L and equipped with a stirrer, continuous polymerization was carried out for 0.47 hours by continuously feeding propylene, hydrogen, triethylaluminum, cyclohexylethyl dimethoxysilane, and the slurry of the preliminarily polymerized catalyst component, maintaining the polymerization temperature at 78° C., the stirring rate at 150 rpm, and the amount of the liquid in the reactor at 18 L, and adjusting the feeding rate of propylene to 15 kg/hour, the feeding rate of hydrogen to 24 NL/hour, the feeding rate of triethylaluminum to 40 mmol/hour, the feeding rate of cyclohexylethyldimethoxysilane to 6 mmol/hour, and the feeding rate of the slurry of the preliminarily polymerized catalyst component, in terms of the solid catalyst component, to 0.40 g/hour. A polymer was discharged at a rate of 4.1 kg/hour.
[Polymerization Step (2)]

The slurry discharged from the reactor in the polymerization step (1) was transferred continuously to a vessel type reactor other than that of the polymerization step (1), and continuous polymerization was further carried out for 0.93 hours by continuously feeding propylene and hydrogen, maintaining the polymerization temperature at 75° C., the stirring rate at 150 rpm, and the amount of the liquid in the reactor at 44 L, and adjusting the feeding rate of propylene to 7 kg/hour and the feeding rate of hydrogen to 8.8 NL/hour. A polymer was discharged at a rate of 5.5 kg/hour.
[Polymerization Step (3)]

The slurry discharged from the reactor in the polymerization step (2) was transferred continuously to a vessel type reactor other than those of the polymerization steps (1) and (2), and continuous polymerization was further carried out for 0.83 hours by maintaining the polymerization temperature at 70° C., the stirring rate at 150 rpm, and the amount of the liquid in the reactor at 44 L. A polymer was discharged at a rate of 3.4 kg/hour.
[Polymerization Step (4)]

The slurry discharged from the reactor in the polymerization step (3) was transferred continuously to a fluidized bed reactor having a capacity of 1 m³ and equipped with a stirrer, and polymerization was carried out for 2.6 hours by continuously feeding propylene and hydrogen, and adjusting the polymerization temperature to 80° C., the polymerization pressure to 1.8 MPa, and the concentration ratio of propylene to hydrogen of the gas in the reactor to 97.9 volume %/2.1 volume % (propylene concentration/hydrogen concentration). A polymer component (Component A) was discharged at a rate of 6.0 kg/hour. The intrinsic viscosities ([η]A) of the resulting polymer component (Component (A)) was 1.48 dL/g.
Production of Component (B)
[Polymerization Step (5)]

The polymer component (Component (A)) discharged from the reactor in the polymerization step (4) was transferred continuously to a fluidized bed reactor having a capacity of 1 m³ and equipped with a stirrer, which reactor was a reactor other than the reactor used in the polymerization step (4), and polymerization was carried out for 2.2 hours by continuously feeding propylene, ethylene, and hydrogen, adjusting the polymerization temperature to 70° C., the polymerization pressure to 1.4 MPa, and the concentration ratio of propylene to ethylene to hydrogen of the gas in the reactor to 65.1 volume %/32 volume %/2.9 volume % (propylene concentration/ethylene level/hydrogen concentration), and adding oxygen as a deactivator at a molar ratio relative to the triethylaluminum being fed in the polymerization step (1) of 0.0124. A propylene-based copolymer was discharged at a rate of 3.5 kg/hour. The thus-obtained propylene-based copolymer is called propylene-based copolymer PP-IX. The intrinsic viscosities (MT) of the resulting propylene-based copolymer was 1.58 dL/g.

The results of analysis of the resulting propylene-based copolymer are given in Table 1.

Comparative Example 8

Production Example of Propylene-Based Copolymer PP-X

The synthesis of a solid catalyst and preliminary polymerization were carried out in the same way as PP-I.
Production of Component (A)
[Polymerization Step (1)]

In a vessel type reactor having a capacity of 40 L and equipped with a stirrer, continuous polymerization was carried out for 0.46 hours by continuously feeding propylene, hydrogen, triethylaluminum, cyclohexylethyl dimethoxysilane, and the slurry of the preliminarily polymerized catalyst component, maintaining the polymerization temperature at 78° C., the stirring rate at 150 rpm, and the amount of the liquid in the reactor at 18 L, and adjusting the feeding rate of propylene to 15 kg/hour, the feeding rate of hydrogen to 23 NL/hour, the feeding rate of triethylaluminum to 40 mmol/hour, the feeding rate of cyclohexylethyldimethoxysilane to 6 mmol/hour, and the feeding rate of the slurry of the preliminarily polymerized catalyst component, in terms of the solid catalyst component, to 0.41 g/hour. A polymer was discharged at a rate of 3.7 kg/hour.

[Polymerization Step (2)]

The slurry discharged from the reactor in the polymerization step (1) was transferred continuously to a vessel type reactor other than that of the polymerization step (1), and continuous polymerization was further carried out for 0.91 hours by continuously feeding propylene and hydrogen, maintaining the polymerization temperature at 75° C., the stirring rate at 150 rpm, and the amount of the liquid in the reactor at 44 L, and adjusting the feeding rate of propylene to 7 kg/hour and the feeding rate of hydrogen to 7.5 NL/hour. A polymer was discharged at a rate of 5.1 kg/hour.

[Polymerization Step (3)]

The slurry discharged from the reactor in the polymerization step (2) was transferred continuously to a vessel type reactor other than those of the polymerization steps (1) and (2), and continuous polymerization was further carried out for 0.81 hours by maintaining the polymerization temperature at 70° C., the stirring rate at 150 rpm, and the amount of the liquid in the reactor at 44 L. A polymer was discharged at a rate of 3.3 kg/hour.

[Polymerization Step (4)]

The slurry discharged from the reactor in the polymerization step (3) was transferred continuously to a fluidized bed reactor having a capacity of 1 m$^3$ and equipped with a stirrer, and polymerization was carried out for 2.8 hours by continuously feeding propylene and hydrogen, and adjusting the polymerization temperature to 80° C., the polymerization pressure to 1.8 MPa, and the concentration ratio of propylene to hydrogen of the gas in the reactor to 98.11 volume %/1.89 volume % (propylene concentration/hydrogen concentration). A polymer component (Component A) was discharged at a rate of 5.6 kg/hour. The intrinsic viscosities ([η]A) of the resulting polymer component (Component (A)) was 1.56 dL/g.

Production of Component (B)

[Polymerization Step (5)]

The polymer component (Component (A)) discharged from the reactor in the polymerization step (4) was transferred continuously to a fluidized bed reactor having a capacity of 1 m$^3$ and equipped with a stirrer, which reactor was a reactor other than the reactor used in the polymerization step (4), and polymerization was carried out for 2.4 hours by continuously feeding propylene, ethylene, and hydrogen, adjusting the polymerization temperature to 70° C., the polymerization pressure to 1.4 MPa, and the concentration ratio of propylene to ethylene to hydrogen of the gas in the reactor to 24.67 volume %/63.3 volume %/12.03 volume % (propylene concentration/ethylene level/hydrogen concentration), and adding oxygen as a deactivator at a molar ratio relative to the triethylaluminum being fed in the polymerization step (1) of 0.0224. A propylene-based copolymer was discharged at a rate of 3.5 kg/hour. The thus-obtained propylene-based copolymer is called propylene-based copolymer PP-X. The intrinsic viscosities (MT) of the resulting propylene-based copolymer was 1.58 dL/g.

The results of analysis of the resulting propylene-based copolymer are given in Table 1.

Example 9

Pellets were obtained in the same way as Example 4 except for changing the propylene-based copolymer to PP-VII. The resulting pellets had an MFR of 8.8 g/10 min.

The resulting pellets were melt-extruded in the same way as Example 4, affording a 30 μm-thick film. The MFR, the haze, the glossiness, the Young's modulus, and the appearance evaluation of the resulting film are given in Table 2.

Example 10

To 100 parts by weight of propylene-based copolymer PP-III were mixed in advance 0.01 parts by weight of hydrotalcite (DHT4C, produced by Kyowa Chemical Industry Co., Ltd.), 0.2 parts by weight of IRGANOX 1010 (tetrakis[methylene-3(3',5'-di-tert-butyl 4-hydroxyphenyl) propionate]methane, produced by Ciba Specialty Chemicals), 0.05 parts by weight of IRGAFOS 168 (tris(2,4-di-tert-butylphenyl) phosphite, produced by Ciba Specialty Chemicals), and 0.1 parts by weight of erucamide (NEUTRON-S, produced by Nippon Fine Chemical Co., Ltd.), and then the resultant was melt-kneaded at 250° C. by using a 40 mm single screw extruder (Model VS40-28, manufactured by Tanabe Plastics Machinery Co., Ltd., equipped with a full flight screw), affording pellets. The resulting pellets had an MFR of 11 g/10 min.

The resulting pellets were melt-extruded in the same way as Example 4, affording a 30 μm-thick film. The MFR, the haze, the glossiness, the Young's modulus, and the appearance evaluation of the resulting film are given in Table 2.

Comparative Example 9

Pellets were obtained in the same way as Example 4 except for changing the propylene-based copolymer to PP-IX. The resulting pellets had an MFR of 10 g/10 min.

The resulting pellets were melt-extruded in the same way as Example 4, affording a 30 μm-thick film. The MFR, the haze, the glossiness, the Young's modulus, and the appearance evaluation of the resulting film are given in Table 2.

Comparative Example 10

Pellets were obtained in the same way as Example 4 except for changing the propylene-based copolymer to PP-X. The resulting pellets had an MFR of 6.8 g/10 min.

The resulting pellets were melt-extruded in the same way as Example 4, affording a 30 μm-thick film. The MFR, the haze, the glossiness, the Young's modulus, and the appearance evaluation of the resulting film are given in Table 2.

TABLE 1

| | Component (A) | Component (B) | | | | MFR |
|---|---|---|---|---|---|---|
| | [η]A dL/g | [η]B dL/g | EB wt % | PB wt % | [η]B/[η]A | (g/10 min) |
| Example 1 | 1.56 | 2.58 | 54 | 24 | 1.7 | 5.1 |
| Example 2 | 1.56 | 2.37 | 62 | 22 | 1.5 | 5.0 |
| Example 3 | 1.56 | 2.42 | 73 | 21 | 1.6 | 5.6 |
| Comparative Example 1 | 1.56 | 3.84 | 72 | 21 | 2.5 | 3.6 |
| Comparative Example 2 | 1.39 | 3.01 | 77 | 19 | 2.2 | 11 |
| Comparative Example 3 | 2.30 | 2.30 | 72 | 21 | 1.0 | 1.4 |
| Example 7 | 1.48 | 2.68 | 53 | 19 | 1.8 | 8.6 |
| Example 8 | 1.48 | 2.47 | 74 | 17 | 1.7 | 9.3 |
| Comparative Example 7 | 1.48 | 2.11 | 38 | 16 | 1.4 | 10 |
| Comparative Example 8 | 1.56 | 1.68 | 76 | 17 | 1.1 | 7.2 |

TABLE 2

| Examples and Comparative Examples | MFR (g/10 min) | MFR ratio before and after melt-kneading | Haze (%) | Glossiness (%) | Young's modulus in MD (MPa) | Appearance (fisheyes/100 cm2) |
|---|---|---|---|---|---|---|
| Example 4 | 5.0 | 1.0 | 80 | 7 | 640 | 18 |
| Example 5 | 5.3 | 1.1 | 83 | 6 | 630 | 15 |
| Example 6 | 5.4 | 1.0 | 84 | 6 | 660 | 7 |
| Comparative Example 4 | 4.0 | 1.1 | 88 | 6 | 620 | 203 |
| Comparative Example 5 | 9.0 | 0.8 | 85 | 6 | 610 | 861 |
| Comparative Example 6 | 1.4 | 1.0 | 57 | 16 | 740 | 519 |
| Example 9 | 8.8 | 1.0 | 72 | 9 | 710 | 8 |
| Example 10 | 11 | 1.2 | 79 | 8 | 710 | 5 |
| Comparative Example 9 | 10 | 1.0 | 61 | 12 | 720 | 5 |
| Comparative Example 10 | 6.8 | 0.9 | 40 | 27 | 820 | 2 |

The films of Examples 4 to 6 and Examples 9 to 10 of the present invention were superior to the films of Comparative Examples 4 and 5 in Young's modulus in the machine direction and appearance evaluation, and the films of Comparative Examples 6, 9, and 10 did not have a haze value suitable as a matte film.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A propylene-based copolymer composed of 60 to 90% by weight of Component (A) that is a polymer component whose major structural unit is a structural unit derived from propylene and 10 to 40% by weight of Component (B) that is a propylene-ethylene copolymer component whose content of a structural unit derived from ethylene is 50 to 80% by weight, wherein the sum total of Component (A) and Component (B) is 100% by weight, wherein the ratio of the intrinsic viscosity of Component (B) ([η]B) to the intrinsic viscosity of Component (A) ([η]A) ([η]B/[η]A) satisfies a formula: $1.3 < [\eta]B/[\eta]A \leq 2.0$, and the melt flow rate, measured at a temperature of 230° C. and a load of 21.18 N, of the copolymer is not less than 5 g/10 minutes and not more than 30 g/10 minutes.

2. A film comprising the propylene-based copolymer according to claim 1.

3. The film according to claim 2, wherein the film is an unstretched film.

4. The film according to claim 2, wherein the film has a haze of 60% or more.

5. The film according to claim 2, wherein the film is a matte film.

6. The film according to claim 3, wherein the film has a haze of 60% or more.

7. The film according to claim 3, wherein the film is a matte film.

8. The film according to claim 4, wherein the film is a matte film.

* * * * *